US005653053A

United States Patent [19]

Handley

[11] Patent Number: 5,653,053
[45] Date of Patent: Aug. 5, 1997

[54] SOIL CONDITIONER SUITABLE AS A SUBSTITUTE FOR SPHAGNUM PEAT MOSS

[75] Inventor: Mont A. Handley, Crown Point, Ind.

[73] Assignee: Wabash Valley Products, Crown Point, Ind.

[21] Appl. No.: 603,701

[22] Filed: Feb. 20, 1996

Related U.S. Application Data

[63] Continuation of Ser. No. 222,598, Apr. 4, 1994, abandoned.

[51] Int. Cl.$^6$ .................. A01G 7/00; A01C 21/00; C05F 9/00; C05F 1/00
[52] U.S. Cl. .............. 47/1.01; 47/9; 47/58; 47/DIG. 10; 71/1; 71/11; 71/19
[58] Field of Search .................. 47/58, 1.01, 9, 47/DIG. 10; 71/1, 11, 14, 19

[56] References Cited

U.S. PATENT DOCUMENTS

| | | | |
|---|---|---|---|
| 3,876,411 | 4/1975 | Fowler | 71/11 |
| 4,067,140 | 1/1978 | Thomas | 47/9 |
| 4,123,489 | 10/1978 | Kelley | 264/141 |
| 4,221,749 | 9/1980 | Dedolph | 264/45.3 |
| 4,297,810 | 11/1981 | Hansford | 47/9 |
| 4,357,780 | 11/1982 | Ball | 47/56 |
| 4,414,776 | 11/1983 | Ball | 47/56 |
| 4,932,156 | 6/1990 | Underwood | 47/9 |

*Primary Examiner*—Elizabeth McElwain
*Attorney, Agent, or Firm*—Gary M. Hartman; Domenica N. S. Hartman

[57] ABSTRACT

A soil conditioning composition is provided which is suitable as a direct substitute for sphagnum peat moss. The composition is composed primarily of waste paper products which have been processed to form small clumped particles. As such, the composition sufficiently exhibits the textural and physical properties of sphagnum peat moss, such that it can be readily mixed into soil in order to promote moisture retention in the soil, as well as enhance aeration of the soil. Furthermore, the composition includes bone meal as a primary constituent. The clumped particles and bone meal are processed such that the bone meal forms a cohesive layer over each of the individual clumped particles, so as to further promote the moisture-retention capability of the particles. Furthermore, the bone meal advantageously contributes fertilizer grade phosphorus the composition.

20 Claims, 1 Drawing Sheet

SOIL CONDITIONER SUITABLE AS A SUBSTITUTE FOR SPHAGNUM PEAT MOSS

This is a continuation of application Ser. No. 08/222,598, filed on Apr. 4, 1994 now abandoned.

The present invention relates to soil conditioning materials of the type used to improve the aeration and moisture retention in soils. More particularly, this invention relates to a soil conditioner which is formed from recycled waste paper and exhibits properties that enable its use as a substitute for sphagnum peat moss, in that the soil conditioner is composed of clumped particles which readily absorb and retain water, while also contributing to the nutritional content of soil in which the soil conditioner is mixed.

BACKGROUND OF THE INVENTION

The use of peat moss, and particularly sphagnum peat moss, for the purpose of conditioning soils is widely practiced by hobbyists and professional gardeners and growers alike. Peat moss is widely used to pack and pot plants, with sphagnum peat moss typically being most preferred by gardeners and growers. When mixed with soil, sphagnum peat moss serves to aerate the soil while simultaneously enhancing moisture retention, both of which are highly desirable soil qualities for starting and growing plants.

Sphagnum peat moss is a type of moss found among deposits of peat, which is essentially the partially decayed plant matter found in bogs and swamps. This particular form of moss has the desirable characteristics of having clustered branchlets and spherical capsules, which contribute to the ability of sphagnum peat moss to retain moisture when mixed with soil. However, the availability of sphagnum peat moss is relatively poor as a result of limited resources of peat, resulting in sphagnum peat moss accounting for only about twenty-five percent of all peat moss produced in the U.S. The present U.S. reserves of peat are estimated to last only another twenty years at current harvesting levels. Even these reserves are in question as a result of legislation which seeks to protect the wetlands which are the source of peat. As a result, peat harvesting is practiced in fewer than half of the states in the U.S., with a majority of the current harvesting occurring in only two of those states.

In view of increasing environmental concerns, substitutes for various types of natural soil conditioners have been sought by the agricultural industry, with many approaches utilizing recycled materials in order to simultaneously provide a use for solid waste materials. For example, U.S. Pat. No. 3,876,411 to Fowler teaches a mulch which is composed of waste organic materials and latex materials which are a byproduct of the manufacture of polymers. Cellulosic materials such as waste paper have generally been identified as a suitable materials for mulches, as recognized by U.S. Pat. Nos. 4,067,140 to Thomas, 4,123,489 to Kelley, 4,297,810 to Hansford, and 4,357,780 and 4,414,776 to Ball. Notably, the above prior art is generally directed to mulches which, by definition, are intended to be spread on the surface of the soil around plants in order to prevent the evaporation of water from the soil and prevent the plant's roots from freezing. Consequently, the mulches taught by the prior art are generally described as having a fibrous character which can be spread or sprayed as an aqueous slurry, or as forming a fibrous web which can be placed in sheet form on the ground. Therefore, the above compositions are not directed toward finding a substitute for sphagnum peat moss, nor are these compositions generally suitable for use as such, primarily due to their fibrous nature which inhibits their ability to mix well into the soil.

Therefore it would be advantageous to provide a substitute for sphagnum peat moss which would exhibit the desired characteristics of this type of moss, such as moisture retention and the ability to readily blend into the soil to provide aeration. Furthermore, it would be advantageous if such a material would be formed from recycled waste materials so as to provide a suitable use for such materials, and also contribute to the nutrient content of the soil in order to promote vigorous growth of plants growing in the soil.

SUMMARY OF THE INVENTION

It is an object of this invention to provide a substitute composition for peat mosses, and particularly sphagnum peat moss, for use as a soil conditioner.

It is another object of this invention that such a composition be formed primarily from waste paper which is processed to form small clumped particles.

It is a further object of this invention that such a composition also include bone meal which forms a cohesive layer over each of the individual clumped particles, so as to promote the retention of moisture within the clumped particles.

It is still a further object of this invention that such a composition be readily processed so as to provide an economical alternative to sphagnum peat moss.

In accordance with a preferred embodiment of this invention, these and other objects and advantages are accomplished as follows.

According to the present invention, a soil conditioning composition is provided which is suitable as a direct substitute for sphagnum peat moss. The composition is composed primarily of waste paper products which have been processed to form small clumped particles. As such, the composition sufficiently exhibits the textural and physical properties of sphagnum peat moss, such that it can be readily mixed into soil in order to promote moisture retention in the soil, as well as enhance aeration of the soil. Furthermore, the composition includes bone meal as a primary constituent. The clumped particles and bone meal are processed such that the bone meal forms a cohesive layer over each of the individual clumped particles, so as to further promote the moisture-retention capability of the particles. Furthermore, the bone meal advantageously contributes fertilizer grade phosphorus to the composition.

The soil conditioning composition of this invention generally utilizes waste paper such as newsprint which has been shredded to form small shredded fragments. Vigorous blending with a limited amount of liquid transforms the shredded fragments into the desired clumped particles, each of which having a sufficiently small size in order to exhibit the desired physical characteristics of sphagnum peat moss. A cohesive layer of bone meal which individually and substantially encases each of the clumped particles is formed by admixing a controlled quantity of agricultural grade bone meal. This cohesive layer assists in the retention of moisture in each of the clumped particles, while also contributing fertilizer grade phosphorus. The soil conditioning composition of this invention is thereby composed of a mass of the coated clumped particles, and is characterized by a texture and a moisture-retention capability which is comparable to that of sphagnum peat moss, while also contributing phosphorus for stimulating plant growth.

The processing method required for the production of the soil conditioning composition of this invention is highly advantageous from the standpoint of material and processing costs. The method primarily includes a shredding operation in which waste paper such as newsprint is reduced to small strips. The strips are then moistened and bone meal is added during a blending operation which is performed for a duration sufficient to raise the temperature of the mixture and substantially transform the strips into clumped particles. Importantly, sufficient moisture must be present in the mixture such that the bone meal will form a slurry which can form a cohesive layer that substantially covers each of the clumped particles. The coated particles are then dried for a duration sufficient to permit separation of the clumped particles, such that a mass of the clumped particles is characterized by a texture and moisture-retention capability comparable to that of sphagnum peat moss. In addition, the cohesive layer of bone meal on each clumped particle forms a dry but adherent layer on each of the particles which will assist in the retention of moisture within each particle and, therefore, within soil in which the particles have been mixed.

From the above, it can be seen that an advantage to the present invention is that the soil conditioning composition provides a suitable substitute for sphagnum peat moss, which is considered a highly desirable but relatively scarce soil conditioner. Primarily, the composition of this invention achieves this capability by having physical and textural properties which are similar to that of sphagnum peat moss, and being composed of clumped particles which will readily retain moisture. The layer of bone meal on each particle further promotes this property, while also serving to retain moisture itself within its gelatinous structure. The bone meal also provides fertilizer grade phosphorus, which is essential for bloom and root growth. As a processed form of waste paper, the composition also provides cellulosic food for microbes within the soil, which act to further promote the nutrient content of the soil.

The clumped structure of the particles is also advantageous when mixing the composition into soil, in that the clumped particles will more readily mix into the soil than will shredded or fibrous particles. Yet the particles also retain some of the advantages of a fibrous structure as a result of being formed from shredded waste paper. In particular, it is believed that the internal fibrous nature of the particles, as opposed to the external clumped structure of the particles, serves to extend the longevity of the cellulosic food for microbes within the soil.

Other objects and advantages of this invention will be better appreciated from the following detailed description.

BRIEF DESCRIPTION OF THE DRAWINGS

The above and other advantages of this invention will become more apparent from the following description when taken in conjunction with the accompanying drawing, in which.

DETAILED DESCRIPTION OF THE INVENTION

Figure 1:
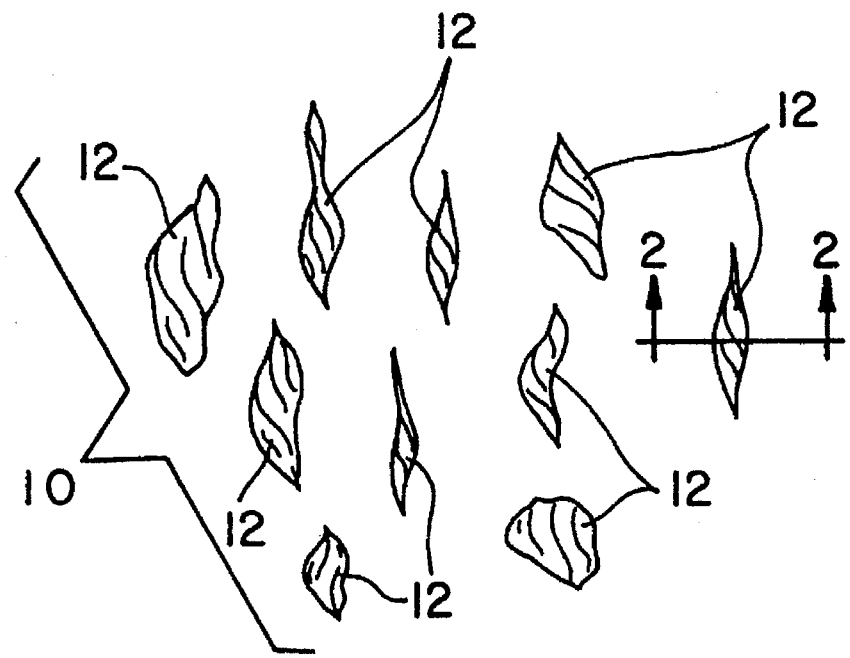
FIG. 1 represents the general appearance of individual particles of the soil conditioning composition in accordance with a preferred embodiment of this invention.
Figure 2:
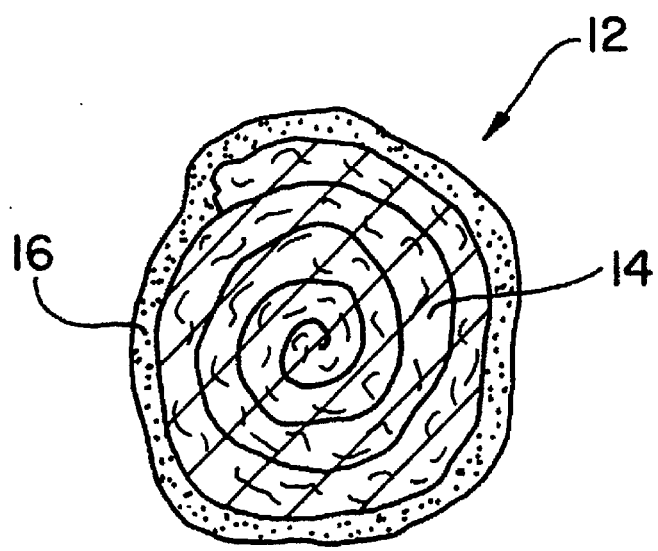
FIG. 2 is a cross-sectional view of an individual particle represented in FIG. 1.

The present invention provides a composition which can be substituted for sphagnum peat moss as a soil conditioning material for soil. As such, the composition simulates the physical and textural characteristics of sphagnum peat moss, resulting in the ability to enhance the retention of moisture within soil in which the composition has been mixed. The physical characteristics of the composition which enable the above are generally represented in FIGS. 1 and 2, which illustrate the soil conditioning composition 10 of this invention as particles 12 having a clustered or clumped shape and structure. The particles 12 may be somewhat elongate, through more spherical shapes are also generally created by the preferred processing method to be described below. Generally, it is preferable that the largest dimension of the particles 12 does not exceed about 8 millimeters in order to assure that the particles 12 will readily mix with soil. In practice, a preferred length for the particles 12 has been found to be about 6 to about 8 millimeters, which results in a composition 10 that is physically distinguishable from mulch materials and, more importantly, is highly suitable for use as a substitute for sphagnum peat moss. For example, the particles 12 produced in accordance with this invention can be readily mixed with shovels or trowels typically used by both commercial growers and home gardeners. However, it is foreseeable that larger sized particles 12 may be suitable under some circumstances.

As shown in FIG. 2, each of the particles 12 is generally composed of a core 14 composed of waste paper which has been substantially encased within a cohesive layer 16 of bone meal. The manner in which the particles 12 are produced preferably yields the generally rolled or coiled structure shown for the core 14, while the bone meal layer 16 generally encases the core 14, but may also be absorbed somewhat into the core 14, particularly between overlapping portions of the core 14. The source of the waste paper can vary considerably, though newsprint is preferred due to its availability, relatively low cost, and its ability to be readily processed to form the desired particles 12 shown in the Figures. For example, the processing of newsprint in accordance with this invention readily produces the tightly clumped particles 12 represented in FIGS. 1 and 2. This tightly clumped structure of the core 14 enhances the ability of the particles 12 to retain moisture, which is a desirable characteristic of sphagnum peat moss and any composition intended as a replacement for sphagnum peat moss.

As is known in the art, bone meal is a product made by grinding animal bones, with commercially available bone meal generally containing tricalcium phosphate and phosphoric acid, with smaller amounts of ammonia also being present. Bone meal preferred for purposes of this invention is of the type designated as fertilizer grade, which is raw bone meal that has not been previously steamed, though steamed bone meal, generally designated as feed grade bone meal, could also be used. The cohesive layer 16 formed by the bone meal in accordance with this invention is generally a dry cohesive layer which adheres to the exposed surfaces of the particles 12. Generally, the bone meal constitutes about 3 to about 5 weight percent of each of the clumped particles 12, based on the mixing rate of bone meal with the waste paper, though it is entirely foreseeable that greater or lesser amounts of bone meal could be utilized and yet obtain particles 12 suitable for use under some conditions. The resulting composition 10 will generally have a density on the order of about 400 to about 600 grams per liter, which advantageously is comparable to that of sphagnum peat moss as used for agricultural purposes.

Because the layer 16 substantially encases the waste paper core 14 of each particle 12, the bone meal serves to assist in the retention of moisture within each of the particles 12. Furthermore, the layer 16 of bone meal also tends to retain moisture, so as to further enhance the moisture-retention capability of the particles 12. As a source of fertilizer grade phosphorus, the layer 16 also contributes to the nutrient content of soil into which the composition 10 is mixed.

As a result of the above structure, the soil conditioning composition 10 of this invention exhibits textural and moisture-retention characteristics very similar to that of sphagnum peat moss, such that the composition 10 is a suitable substitute for sphagnum peat moss as a soil conditioning agent. Yet the composition 10 of this invention is superior to sphagnum peat moss to the extent that the composition 10 includes bone meal which contributes phosphorus to the soil for stimulating plant growth. If desired, a more natural appearance for the composition 10 can be achieved by adding a coloring additive during blending.

The method by which the soil conditioning composition 10 of this invention is preferably produced is generally as follows. Waste paper, preferably newsprint such as newspaper, is reduced by shredding to form strips whose size is preferably on the order of up to about 400 millimeters in length and up to about 50 millimeters in width, and more preferably about 300 to about 400 millimeters in length and about 30 to about 50 millimeters in width. The strips are then moistening by adding water in amounts of about 300 to about 450 milliliters per kilogram of waste paper. The moistened strips are then fed into a blending apparatus which preferably utilizes one and preferably two or more chopping blades that rotate rapidly just above the floor of the blending apparatus. Those skilled in the art will appreciate that numerous types of blending devices and equipment could be used for this purpose, such that the above description for the blending apparatus will generally be sufficient for purposes of describing the process of this invention.

As the strips are being processed by the blending apparatus, bone meal is added to the apparatus in amounts sufficient to substantially encase each of the clumped particles 12 produced during blending. In practice, the addition of about 10 to about 20 grams of dry bone meal for approximately every 250 to 350 grams of dry strips has been found to be satisfactory. It has been determined that moistening the bone meal and allowing it to sit for several hours or more serves to significantly promote the blending of the bone meal with the clumped particles, as well as the coating of the clumped particles during blending. For this purpose, it is believed that sufficient water should be added to at least substantially moisten the bone meal, and that the moistened bone meal should then be allowed to sit for a duration on the order of about twelve hours, though it is foreseeable that durations significantly longer or shorter than this could also produce suitable results.

Before, during or after the addition of bone meal, additional water can be introduced into the apparatus, as well as any coloring additive desired, such as Mulch Magic PF Color available from Becher-Underwood, Inc. of Ames, Iowa. However, excessive moisture must be avoided in order to prevent the creation of a slurry with the paper strips which would prevent the formation of the desired clumped particles 12. The strips and bone meal are blended within the apparatus for a duration sufficient to raise the temperature of the mixture, and substantially transform the strips into the desired clumped particles 12 which are substantially encased by the cohesive layer 16 of bone meal. Once the physical shape of the particles 12 is acquired, the particles 12 are dried for a duration which is sufficient to permit the clumped particles 12 to be freely separated and subsequently handled for packaging. Importantly, in accordance with standard shipping regulations, the moisture content of the particles 12 must be sufficiently reduced by drying such that the composition 10 will not pose a fire hazard due to the potential for cellulosic materials to spontaneously combust. For this purpose, air drying has been found to be suitable, though the assistance of ovens or other heating equipment is foreseeable.

Variations on the processing order outlined above are foreseeable, including prolonged blending of the strips prior to adding the bone meal so as to further reduce the size of the strips. In addition, all of the water added to the strips could be introduced prior to the blending operation or, alternatively, introduced entirely during the blending operation, such as by simultaneously adding water at the same time the bone meal is added. Consequently, with the proper equipment, it is foreseeable that dry strips, bone meal and water could be introduced simultaneously during the blending operation.

From the above, it can be seen that a significant advantage of this invention is that the soil conditioning composition 10 provides a suitable substitute for sphagnum peat moss, a highly desirable but relatively scarce soil conditioner in terms of production for use by commercial and home gardeners. Primarily, the composition 10 of this invention achieves this capability by having physical and textural properties which are similar to that of sphagnum peat moss, in that the clumped particles 12 of which the composition 10 is composed is readily able to retain moisture. The bone meal layer 16 on each particle 12 further promotes this property, while also serving to retain moisture itself within its gelatinous structure. The bone meal adhered to the surface of the particles 12 also provides fertilizer grade phosphorus, which is essential for bloom and root growth. As a processed form of waste paper, the composition 10 of this invention also provides cellulosic food for microbes within the soil, which act on the waste paper to further promote the nutrient content of the soil.

Another significant advantage of this invention is that the clumped structure of the particles 12 enables the composition 10 to be readily mixed into the soil. Yet the particles 12 also retain some of the advantages of a fibrous structure as a result of being formed from shredded waste paper. In particular, it is believed that the internal fibrous nature of the core 14, as opposed to the external clumped structure of the particles 12, serves to extend the longevity of the cellulosic food for microbes within the soil. The clumped structure and moisture-retention capability of the particles 12 also reduces the tendency for soil erosion due to the action of wind over bare ground.

Finally, the relatively low cost of the materials and processing required to produce the soil conditioning composition 10 of this invention yields an economical alternative to sphagnum peat moss. As a result, this invention represents a viable substitute to sphagnum peat moss, and will correspondingly create a lower demand for a natural soil conditioner whose harvesting from peat-rich wetlands poses an environmental risk. The composition 10 of this invention is also economical to use in that it serves a dual role—one as a soil conditioner in lieu of sphagnum peat moss, the other being a source of phosphorus. Thus, the composition 10 is economical in that only one product is required to fill both roles, while another significant advantage is that the use of the composition 10 saves the user time otherwise required to add fertilizers to the soil.

While our invention has been described in terms of a preferred embodiment, it is apparent that other forms could be adopted by one skilled in the art, such as by modifying the shape of the particles 12, utilizing different sources of waste paper, adding adjuncts during blending which do not materially alter the desired physical and textural properties of the composition 10 and its particles 12, altering or modifying the processing steps described above yet achieving the desired particles 12 described, or employing the composition 10 for purposes other than a substitute for sphagnum peat moss. Accordingly, the scope of our invention is to be limited only by the following claims.

The embodiments of the invention in which an exclusive property or privilege is claimed are defined as follows:

1. A soil conditioner having physical properties that promote soil aeration and moisture retention when mixed into soil for agricultural purposes, the soil conditioner comprising:

a plurality of shredded fragments of waste paper, each of which forms a clumped particle having a maximum dimension of up to about 8 millimeters so as to promote mixing of the soil conditioner with soil; and a cohesive layer of bone meal individually coating each of the clumped particles so as to assist in the retention of moisture within each of the clumped particles while also contributing fertilizer grade phosphorus to each of the clumped particles;

wherein the soil conditioner is composed of a mass of the clumped particles and is characterized by a texture, density and moisture-retention capability comparable to that of sphagnum peat moss, while also contributing phosphorus for stimulating plant growth.

2. A soil conditioner as recited in claim 1 wherein the layer of bone meal constitutes about 3 to about 5 weight percent of each of the clumped particles.

3. A soil conditioner as recited in claim 1 wherein each of the clumped particles has a rolled structure.

4. A soil conditioner as recited in claim 1 wherein the density of the soil conditioner is about 400 to about 600 grams per liter.

5. A soil conditioner having physical properties that promote soil aeration and moisture retention when mixed into soil for agricultural purposes, the soil conditioner consisting essentially of:

a plurality of shredded fragments of newsprint, each of which individually forms a rolled particle having a maximum dimension of up to about 8 millimeters so as to promote mixing of the soil conditioner with soil; and a cohesive layer of bone meal individually coating each of the rolled particles so as to assist in the retention of moisture within each of the rolled particles and retain moisture within the cohesive layer while also contributing fertilizer grade phosphorus to each of the rolled particles;

wherein the soil conditioner is composed era mass of the rolled particles and is characterized by a texture, density, and moisture-retention capability comparable to that of sphagnum peat moss, while also contributing phosphorus for stimulating plant growth.

6. A soil conditioner as recited in claim 5 wherein the layer of bone meal constitutes about 3 to about 5 weight percent of each of the rolled particles.

7. A soil conditioner as recited in claim 5 further comprising a coloring additive.

8. A soil conditioner as recited in claim 5 wherein the density of the soil conditioner is about 400 to about 600 grams per liter.

9. A method for forming a soil conditioner having physical properties that promote soil aeration and moisture retention when mixed into soil for agricultural purposes, the method comprising the steps of:

shredding waste paper to form strips;

moistening the strips;

adding bone meal to the strips;

blending the strips and bone meal for a duration sufficient to transform the strips into clumped particles having a rolled structure, a sufficient amount of the bone meal being present such that each of the clumped particles is substantially encased by a cohesive layer of bone meal; and drying the clumped particles for a duration sufficient to permit separation of the clumped particles and thereby yield a soil conditioner that promotes soil aeration and moisture retention when mixed into soil, wherein the cohesive layer of bone meal on each clumped particle assists in the retention of moisture therein, the density of the soil conditioner is approximately equal to sphagnum peat moss used for agricultural purposes, and the soil conditioner is characterized by a texture and moisture-retention capability comparable to that of sphagnum peat moss.

10. A method as recited in claim 9 wherein the shredding step utilizes newsprint as the waste paper.

11. A method as recited in claim 9 wherein the shredding step produces strips having lengths of up to about 400 millimeters and widths of up to about 50 millimeters.

12. A method as recited in claim 9 further comprising the step of blending the strips prior to adding the bone meal so as to further reduce the size of the strips.

13. A method as recited in claim 9 further comprising the step of adding water to the bone meal in an amount which is sufficient to moisten all of the bone meal prior to the adding step so as to promote coating of the clumped particles by the bone meal during the blending step.

14. A method as recited in claim 9 wherein the step of adding bone meal to the strips includes adding about 10 to about 20 grams of dry bone meal per about 250 to about 350 grams of the waste paper when dry.

15. A method as recited in claim 9 wherein the moistening step occurs during the blending step.

16. A method as recited in claim 9 wherein the moistening step occurs during the adding step.

17. A method as recited in claim 9 wherein the moistening, adding and blending steps occur concurrently.

18. A method as recited in claim 17 further comprising the steps of blending the strips prior to adding the bone meal so as to further reduce the size of the strips.

19. A method as recited in claim 17 further comprising the step of adding water to the bone meal in an amount which is sufficient to moisten all of the bone meal prior to the adding step so as to promote coating of the clumped particles by the bone meal during the blending step.

20. A method as recited in claim 17 wherein the step of adding bone meal to the strips includes adding about 10 to about 20 grams of dry bone meal per about 250 to about 350 grams of the waste paper when dry.

* * * * *